(12) United States Patent
Seki et al.

(10) Patent No.: US 6,591,186 B1
(45) Date of Patent: Jul. 8, 2003

(54) VEHICLE NAVIGATION DEVICE

(75) Inventors: Masashi Seki, Nagaoka (JP); Kazuma Kurihara, Nagaoka (JP)

(73) Assignee: Nippon Seiki Co., Ltd., Niigata (JP)

( * ) Notice: Subject to any disclaimer, the term of this patent is extended or adjusted under 35 U.S.C. 154(b) by 83 days.

(21) Appl. No.: 09/869,543

(22) PCT Filed: Oct. 23, 2000

(86) PCT No.: PCT/JP00/07396

§ 371 (c)(1),
(2), (4) Date: Jun. 29, 2001

(87) PCT Pub. No.: WO01/33170

PCT Pub. Date: May 10, 2001

(30) Foreign Application Priority Data

Aug. 29, 1999 (JP) ............................................ 11-308000

(51) Int. Cl.[7] ............................................... G01C 21/26
(52) U.S. Cl. ....................... 701/207; 701/200; 701/208; 342/357.01; 340/988; 340/990
(58) Field of Search ................................ 701/200, 206, 701/207, 208, 211, 216, 300, 66; 342/357.01, 357.06, 357.13; 340/988, 990, 995

(56) References Cited

U.S. PATENT DOCUMENTS 5,089,826 A * 2/1992 Yano et al. .................. 342/457
5,189,430 A * 2/1993 Yano et al. .................. 342/457

FOREIGN PATENT DOCUMENTS

| JP | 6-180234 | 6/1994 |
| JP | 7-332990 | 12/1995 |
| JP | 8-5721 | 1/1996 |
| JP | 8-16992 | 1/1996 |
| JP | 9-297037 | 11/1997 |
| JP | 11-240355 | 9/1999 |

* cited by examiner

*Primary Examiner*—Gertrude Arthur
(74) *Attorney, Agent, or Firm*—McDermott, Will & Emery

(57) ABSTRACT

There are included a sensor 310 which outputs pulse signals corresponding to the traveling distances of a vehicle, a vehicle display device 100 which displays, based on the pulse signals, vehicle information including the traveling distance, and a navigation unit 200 which receives the distance data related to the traveling distances, obtained by processing the pulse signals, being outputted from the vehicle display device 100 or the pulse signals at a certain reception period to calculate the present position of the vehicle, and controls the vehicle display device 100 to display road traffic information including the display synthesized with the present position on a map in accordance with map data read from a map information memory medium 230. If the navigation unit 200 can not receive the distance data or the pulse signals within the reception period, an estimated value of a value to be received this time is obtained from the difference between a value inputted last time and a value inputted last time but one and the navigation unit 200 calculates the present position in accordance with the estimated value.

8 Claims, 3 Drawing Sheets

VEHICLE NAVIGATION DEVICE

TECHNICAL FIELD

The present invention relates to a navigation device installed in a vehicle.

BACKGROUND ART

In recent years, the kinds and the quantities of various pieces of information for supporting a driving operation, which are provided to a user such as a driver in accordance with the change of surroundings around a vehicle, have been rapidly increasing. For example, in addition to vehicle information such as traveling speed, traveling distance, arbitrary interval distance, fuel residual quantity, cooling water temperature, and the like, there is navigation information for displaying a present position or an object point on a map, or road traffic information transmitted through electric wave signals. For the purpose of effectively transmitting lots of such information to the user, as shown in FIG. 3, a vehicle display device 100 is proposed in which an information display unit 30, such as a liquid crystal panel, capable of displaying an image is incorporated together with pointer drive units 10 and 20 each of which points a value by rotation movement of a pointer on a dial plate (for example, see Japanese Patent Unexamined Publication No. Hei. 11-240355). Incidentally, reference numeral 40 designates a digital display unit which is made of a display element, such as a fluorescent display tube, enabling a numerical display and displays the traveling distance and the interval distance.

That is, the vehicle display device 100 is structured such that the pointer drive units 10 and 20 and the digital display unit 40 display the vehicle information, and the information display unit 30 displays the road traffic information.

By this, since the user can instantaneously confirm the plural pieces of information such as the vehicle information and the road traffic information in the one vehicle display device 100, it is convenient.

Problem to be Solved by the Invention

In a recent navigation device, a so-called hybrid type one is dominant. This is such that the position data of the present place calculated by a not-shown navigation unit receiving an electric wave from a GPS satellite and the distance data of a traveling distance from a start point, which is calculated by a control device of the vehicle display device 100 on the basis of pulse signals outputted from not-shown sensor portions set at respective portions of the vehicle and corresponding to the traveling of the vehicle, are collectively used and the present position of the vehicle is obtained by a control device of the navigation unit.

Thus, the navigation unit must receive the distance data every certain time (for example, several hundred milliseconds), and if this input stops, accurate position calculation is not performed, and there occurs such a disadvantage that the renewal of the display on the display device 30 is delayed.

DISCLOSURE OF THE INVENTION

The present invention includes a sensor which outputs a pulse signal corresponding to a traveling distance of a vehicle, a vehicle display device which displays, based on the pulse signal, vehicle information including the traveling distance, and a navigation unit which receives distance data related to the traveling distance, obtained by processing the pulse signal, being outputted from the vehicle display device or the pulse signal at a certain reception period to calculate a present position of the vehicle, and controls the vehicle display device to display road traffic information including a display synthesized with the present position on a map on the basis of map data read from a map information memory medium, and is characterized in that in the case where the navigation unit can not receive the distance data or the pulse signal within the reception period, an estimated value of a value to be received this time is obtained from a variation between a value inputted last time and a value inputted last time but one, and the navigation unit calculates the present position on the basis of the estimated value. By carrying out the estimate processing, the navigation unit can temporarily obtain the distance data or the pulse signal at the certain reception period, so that deterioration of the display, such as non-renewal of the display, can be suppressed.

Besides, the invention includes a sensor which outputs a pulse signal corresponding to a traveling distance of a vehicle, a vehicle display device which displays, based on the pulse signal, vehicle information including the traveling distance, and a navigation unit which receives distance data related to the traveling distance, obtained by processing the pulse signal, being outputted from the vehicle display device or the pulse signal at a certain reception period to calculate a present position of the vehicle, and controls the vehicle display device to display road traffic information including a display synthesized with the present position on a map on the basis of map data read from a map information memory medium, and is characterized in that in the case where the navigation unit can not receive the distance data or the pulse signal within the reception period, an estimated value of a value to be received this time is obtained from a variation between a value inputted last time and a value inputted last time but one, the navigation unit calculates the present position on the basis of the estimated value, and an error contained in the estimated value is calculated and corrected from a value to be properly received in future and the estimated value. By carrying out the estimate processing, the navigation unit can temporarily obtain the distance data or the pulse signal at the certain reception period, so that deterioration of the display, such as non-renewal of the display, can be suppressed.

Besides, there is a feature that a serial communication line for transferring the estimated value obtained by the vehicle display device to the navigation unit is connected between the vehicle display device and the navigation unit, and even in a structure in which the distance data or the pulse signal is transferred through the serial communication having a low communication speed, by carrying out the estimate processing, the navigation unit can temporarily obtain the distance data or the pulse signal at the certain reception period, so that deterioration of the display, such as non-renewal of the display, can be suppressed.

Besides, there is a feature that the navigation unit has a built-in control device for obtaining the estimated value by the navigation unit, and the control device for obtaining the estimated value can be also used for a control device for controlling the navigation unit, and in this case, cost reduction by the common use of parts can be realized.

Besides, the invention includes a sensor which outputs a pulse signal corresponding to a traveling distance of a vehicle, a vehicle display device which displays, based on the pulse signal, vehicle information including the traveling distance, and a navigation unit which receives distance data related to the traveling distance, obtained by processing the pulse signal, being outputted from the vehicle display device at a certain reception period to calculate a present position of the vehicle, and controls the vehicle display device to display road traffic information including a display synthesized with the present position on a map on the basis of map data read from a map information memory medium, and is characterized in that the distance sensor and the vehicle display device are connected to a bus wired to be drawn around in an inside of the vehicle, the vehicle display device and the navigation unit are connected to each other through a serial communication line, and in the case where the navigation unit can not receive the distance data within the reception period, an estimated value of a value to be received this time is obtained from a variation between a value inputted last time and a value inputted last time but one, and the navigation unit calculates the present position on the basis of the estimated value. By carrying out the estimate processing, the navigation unit can temporarily obtain the distance data at the certain reception period, so that deterioration of the display, such as non-renewal of the display, can be suppressed.

Besides, the invention includes a sensor which outputs a pulse signal corresponding to a traveling distance of a vehicle, a vehicle display device which displays, based on the pulse signal, vehicle information including the traveling distance, and a navigation unit which receives distance data related to the traveling distance, obtained by processing the pulse signal, being outputted from the vehicle display device at a certain reception period to calculate a present position of the vehicle, and controls the vehicle display device to display road traffic information including a display synthesized with the present position on a map on the basis of map data read from a map information memory medium, and is characterized in that the distance sensor and the vehicle display device are connected to a bus wired to be drawn around in an inside of the vehicle, the vehicle display device and the navigation unit are connected to each other through a serial communication line, and in the case where the navigation unit can not receive the distance data within the reception period, an estimated value of a value to be received this time is obtained from a variation between a value inputted last time and a value inputted last time but one, the navigation unit calculates the present position on the basis of the estimated value, and an error contained in the estimated value is calculated and corrected from a value to be properly received in future and the estimated value. By carrying out the estimate processing, the navigation unit can temporarily obtain the distance data at the-certain reception period, so that deterioration of the display, such as non-renewal of the display, can be suppressed.

BEST MODE FOR CARRYING OUT THE INVENTION

The present invention will be described on the basis of an embodiment shown in the attached drawings, and portions identical to or similar to those of the prior art are designated by the same characters and the detailed description is omitted.

Figure 1:
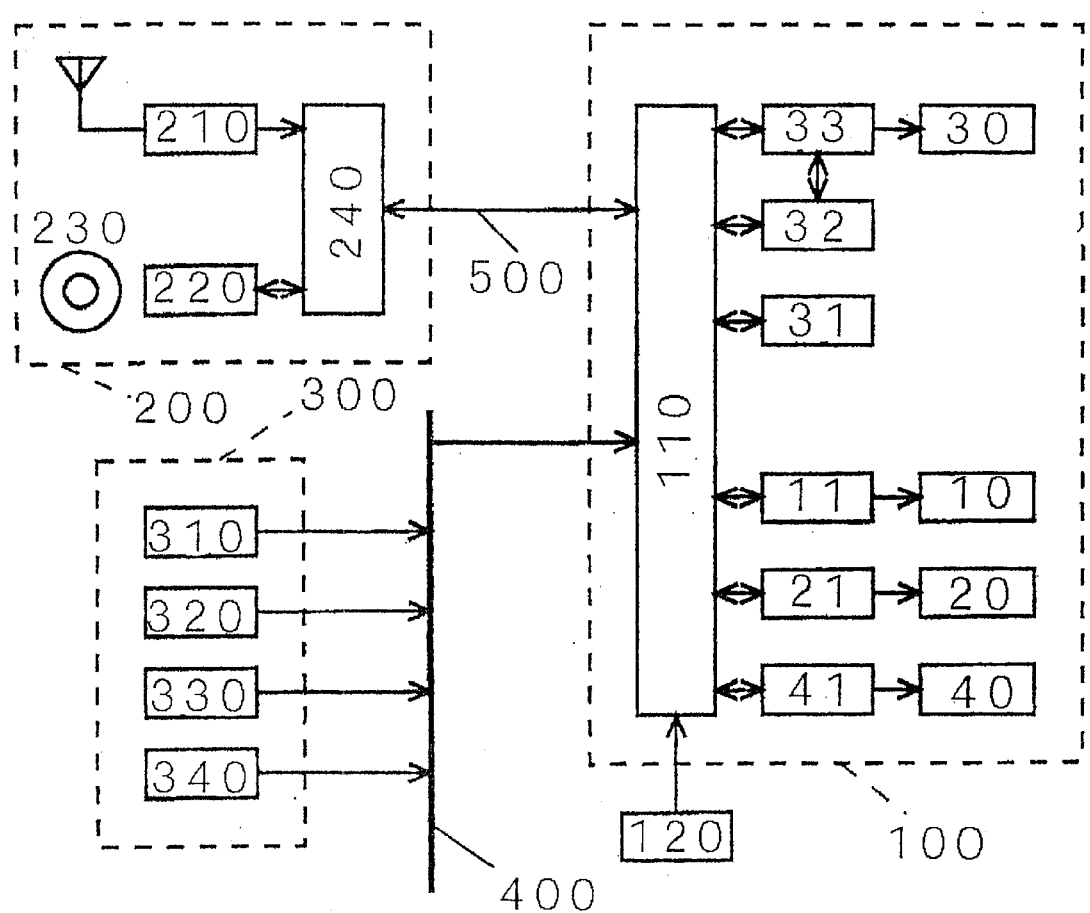
FIG. 1 is a whole structure view of an embodiment of the present invention.
Figure 3:
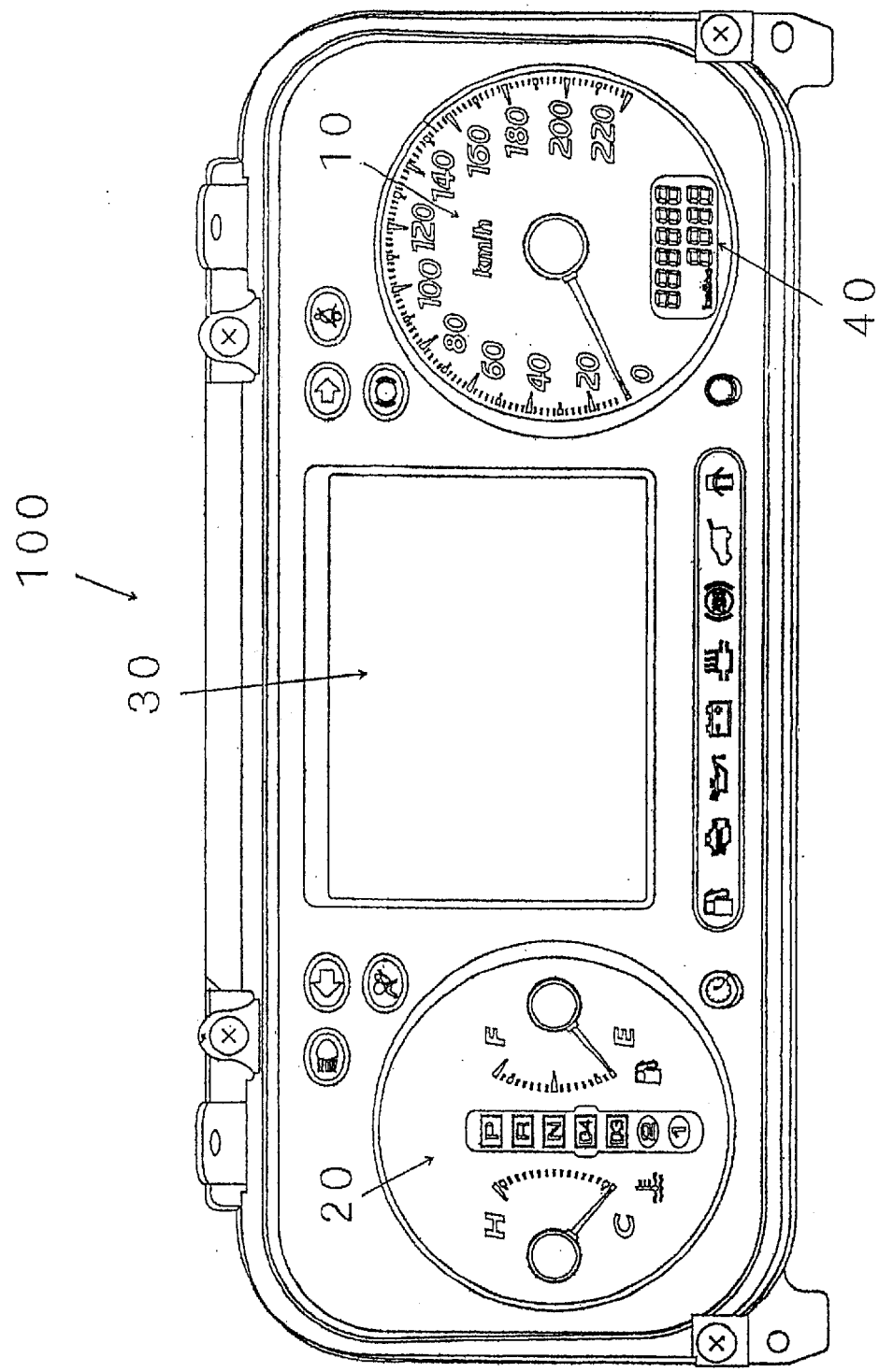
FIG. 3 is a front view of a vehicle display device for explaining the prior art.

FIG. 1 explains an electric circuit for driving the vehicle display device 100 shown in FIG. 3, in which reference numeral 210 designates a reception device (present position measurement device) for receiving an electric wave from a GPS satellite and outputting position data of a present place of a vehicle; 220, a readout device for reading map data from a map information memory medium 230 such as a CD-ROM; and 240, a control device, such as a micon, for controlling these systems, and the above constitute the navigation unit 200, which is normally installed at a place distant from a driver's seat, such as a trunk room of the vehicle, for example, a place where the electric wave from the GPS satellite can be satisfactorily received.

Reference numeral 300 designates a sensor portion installed at a respective portion of the vehicle and outputting information of the respective portion of the vehicle and traveling information, which includes, for example, a distance sensor 310 for outputting a pulse signal corresponding to a traveling distance, a rotation sensor 320 for outputting a pulse signal corresponding to an engine speed, a fuel sensor 330 for outputting a fuel residual quantity as a voltage value, a temperature sensor 340 for outputting a cooling water temperature as a voltage value, and the like, and they are transferred to the vehicle display device 100 through a bus 400 wired to be drawn around in the inside of the vehicle. Incidentally, the voltage values outputted from the fuel sensor 330, the temperature sensor 340 and the like are transferred as digital signals through a not-shown interface circuit.

The vehicle display device 100 is connected to the navigation unit 200 through a serial communication line 500 such as an RS232 cable and is connected to the bus 400, in which reference numeral 110 designates a control device, such as a micon, connected to the control device 240 of the navigation unit 200 through the serial communication line 500 and making control to display an image; 31, a buffer memory for storing map data (transfer information) from the readout device 220; 32, a display image memory for extracting and copying a range necessary for the display from the map data expanded in the buffer memory 31; and 33, a display controller for displaying the map data copied in the display image memory 32 on the display device 30. The content of the display image memory 32 is renewed in accordance with the change of the present position, and the display on the display device 30 is also changed in accordance with this.

An input device 120, such as a keyboard, which enables a user, such as a driver, to make various operations, for example, setting (route setting) of a start point and an arrival point, or recording of traveling data, is connected to the vehicle display device 100. Besides, the vehicle display device 100 includes driving circuits 11, 21, and 41 for receiving various signals from the sensor portion 300 and for causing the pointer drive units 10, 20 and the digital display unit 40 to carry out a predetermined display. Although these driving circuits 11, 21 and 41 may be controlled by a control device such as a dedicated micon, they can also be controlled through input/output control of signals to the navigation unit 200 or by the control device 110 for controlling the display on the display device 30 in accordance with this, and in this case, cost reduction by the common use of parts can be realized.

Incidentally, in the navigation device, a so-called option product, which is additionally purchased after the purchase of a vehicle, is generally dominant, and in order that attachment work can be easily performed, a structure is adopted in which a connecting connector or the like is previously prepared in the vehicle display device 100 located in front of a driver's seat in the compartment of the vehicle and at a position where the work is relatively easy, and the navigation unit 200 is connected to this.

In the navigation unit 200, the control device 240 obtains the present position of the vehicle by collectively using the position data obtained by the reception device 210 receiving the electric wave from the GPS satellite, and the distance data related to the traveling distance, which is obtained by the control device 110 of the vehicle display device 100 processing the pulse signal from the distance sensor 310 of the sensor portion 300. Thus, the distance sensor 310 has the function of the present position measurement device, and the navigation unit 200 is set by the control device 240 so that the distance data is inputted at a certain reception period (for example, 350±50 milliseconds) T1.

Next, a processing carried out in the vehicle display device 100 will be described with reference to FIG. 2.

The vehicle display device 100 is provided with a not-shown timer, this timer is set to a previously set certain reception period (for example, 390 milliseconds) T2 shorter than the upper limit value of the reception period T1, and it is cleared when the distance data is outputted to the navigation unit 200 even if it does not reach the reception period, and again starts to count from "0 second".

Figure 2:
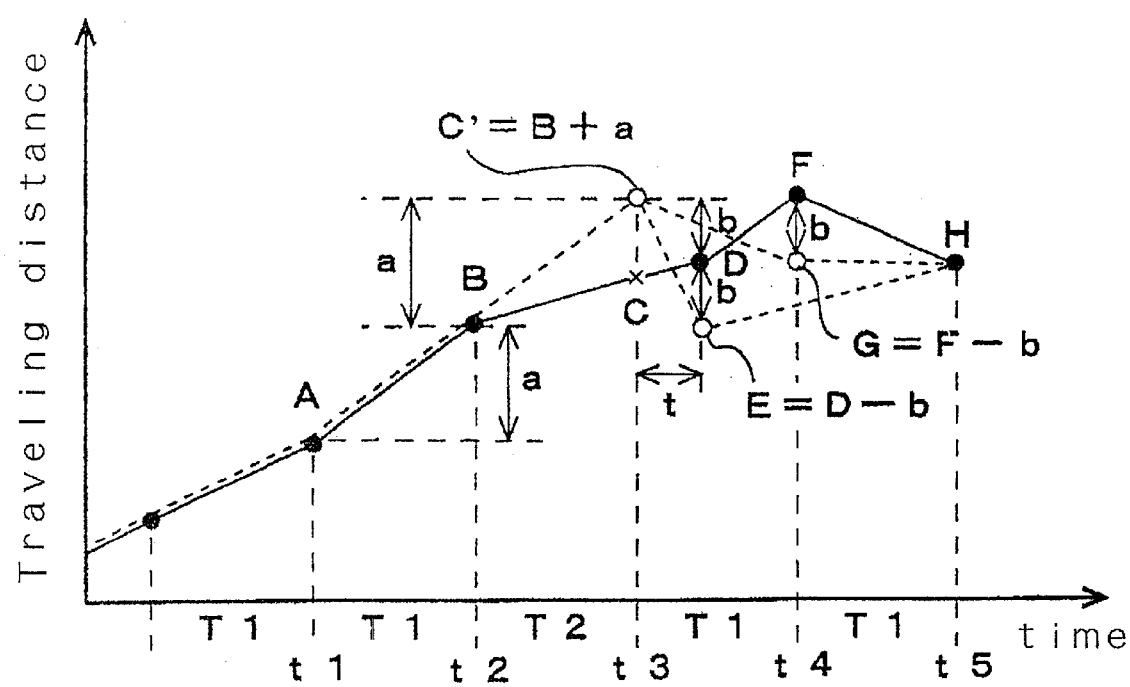
FIG. 2 is a characteristic view for explaining the processing in the above.

In the case where the vehicle display device 100 receives the pulse signal corresponding to the traveling distance from the distance sensor 310 of the sensor portion 300 within the reception period and transfers the distance data to the navigation-unit 200, the calculation of the present position of the vehicle is accurately performed in the navigation unit 200, and the display on the display device 30 of the vehicle display device 100 is at any time renewed in accordance with this (t1, t2 of FIG. 2).

In the case where the navigation unit 200 does not receive the distance data in a reception period T2 (t3 of FIG. 2), the control device 110 of the vehicle display device 100 calculates a variation "a" from a value B at the last time t2 and a value A at the last time t1 but one, and transfers an estimated value C' obtained by adding the variation "a" to the value B at the last time t2, instead of a not-received value C at this time t3, to the navigation unit 200. At this time, the timer is cleared.

Thereafter, when the pulse signal corresponding to the traveling distance from the distance sensor 310, which is stopped by some cause, is received, an error "b" between a value D corresponding to that and the temporarily transferred value C' is obtained.

If the count value t of the timer at this time is within the reception period T1, a correction value E (=D−b) obtained in view of the error "b" in the value D is transferred. If it is less than the lower limit value (300 milliseconds) of the reception period T1, the value D is neglected and a correction value G (=F−b) obtained in view of the error "b" in a value F inputted after the reception period T1 is transferred (t4 of FIG. 2).

Incidentally, in the case where the navigation unit 200 does not receive the distance data at the reception period T2 consecutively two times or more, although the transfer of the estimated value is repeated several times and a correction value thereafter is transferred, it is seldom that there are two or more consecutive occurrences. A general conceivable case is such that data of the pulse signal corresponding to the traveling distance from the distance sensor 310 with low priority is blocked by the transfer of other data with high priority and is not transferred, and such a case is instantaneously dissolved, so that it can be said that a possibility the navigation unit 200 does not receive the distance data at the reception period T2 consecutively two times or more is considerably low.

Thereafter, a return to the normal processing is made (t5 of FIG. 2). Accordingly, from the relation between the count value t and the reception period T1, it is divided into a case of C'→E→H and a case of C'→G→H.

Incidentally, although the structure in which a series of processings are carried out at the side of the vehicle display device 100, that is, the control device 110, has been described, a structure can also be made such that they are carried out in the navigation unit 200, that is, the control device 240.

Like this, in the case of the so-called hybrid type vehicle navigation device, although the control device 240 obtains the present place of the vehicle by collectively using the position data obtained by the reception device 210 receiving the electric wave from the GPS satellite, and the distance data related to the traveling distance, which is obtained by the control device 110 of the vehicle display device 100 processing the pulse signal from the distance sensor 310 of the sensor portion 300, a structure may be adopted in which the control device 240 obtains the present value of the vehicle from, instead of the distance data, the pulse signal from the distance sensor 310 and the position data.

Incidentally, as the sensor outputting the pulse signal corresponding to the traveling distance of the vehicle, in addition to the distance sensor 310 described before, a speed sensor or the like can be used.

Possibility of Use in Industry

As described above, according to the present invention, even if the navigation unit can not receive the distance data or the pulse signal by some reason, which is necessary for the navigation unit to calculate the present position of the vehicle, the estimate processing is carried out, so that the navigation unit can temporarily obtain the distance data or the pulse signal at a certain reception period, and therefore, the deterioration of the display, such as non-renewal of the display of road traffic information on the display device of the vehicle display device, can be suppressed.

What is claimed is:

1. A vehicle navigation device comprising: a sensor which outputs a pulse signal corresponding to a traveling distance of a vehicle; a vehicle display device which displays, based on the pulse signal, vehicle information including the traveling distance; and a navigation unit which receives distance data related to the traveling distance, obtained by processing the pulse signal, being outputted from the vehicle display device or the pulse signal at a certain reception period to calculate a present position of the vehicle, and controls the vehicle display device to display road traffic information including a display synthesized with the present position on a map on the basis of map data read from a map information memory medium, the vehicle navigation device characterized in that in the case where the navigation unit can not receive the distance data or the pulse signal within the reception period, an estimated value of a current value to be received is obtained from a variation between a value inputted previously and a value inputted the time before, and the navigation unit calculates the present position on the basis of the estimated value.

2. A vehicle navigation device according to claim 1, wherein a serial communication line for transferring the estimated value obtained by the vehicle display device to the navigation unit is connected between the vehicle display device and the navigation unit.

3. A vehicle navigation device according to claim 1, wherein the navigation unit has a built-in control device for obtaining the estimated value by the navigation unit.

4. A vehicle navigation device comprising: a sensor which outputs a pulse signal corresponding to a traveling distance of a vehicle, a vehicle display device which displays, based on the pulse signal, vehicle information including the traveling distance, and a navigation unit which receives distance data related to the traveling distance, obtained by processing the pulse signal, being outputted from the vehicle display device or the pulse signal at a certain reception period to calculate a present position of the vehicle, and controls the vehicle display device to display road traffic information including a display synthesized with the present position on a map on the basis of map data read from a map information memory medium, the vehicle navigation device characterized in that in the case where the navigation unit can not receive the distance data or the pulse signal within the reception period, an estimated value of a current value to be received is obtained from a variation between a value inputted previously and a value inputted the time before, the navigation unit calculates the present position on the basis of the estimated value, and an error contained in the estimated value is calculated and corrected from a value to be properly received in future and the estimated value.

5. A vehicle navigation device according to claim 4, wherein a serial communication line for transferring the estimated value obtained by the vehicle display device to the navigation unit is connected between the vehicle display device and the navigation unit.

6. A vehicle navigation device according to claim 4, wherein the navigation unit has a built-in control device for obtaining the estimated value by the navigation unit.

7. A vehicle navigation device comprising: a sensor which outputs a pulse signal corresponding to a traveling distance of a vehicle; a vehicle display device which displays, based on the pulse signal, vehicle information including the traveling distance; and a navigation unit which receives distance data related to the traveling distance, obtained by processing the pulse signal, being outputted from the vehicle display device at a certain reception period to calculate a present position of the vehicle, and controls the vehicle display device to display road traffic information including a display synthesized with the present position on a map on the basis of map data read from a map information memory medium, the vehicle navigation device characterized in that the distance sensor and the vehicle display device are connected to a bus wired to be drawn around in an inside of the vehicle, the vehicle display device and the navigation unit are connected to each other through a serial communication line, and in the case where the navigation unit can not receive the distance data within the reception period, an estimated value of a current value to be received is obtained from a variation between a value inputted previously and a value inputted the time before, and the navigation unit calculates the present position on the basis of the estimated value.

8. A vehicle navigation device comprising: a sensor which outputs a pulse signal corresponding to a traveling distance of a vehicle; a vehicle display device which displays, based on the pulse signal, vehicle information including the traveling distance; and a navigation unit which receives distance data related to the traveling distance, obtained by processing the pulse signal, being outputted from the vehicle display device at a certain reception period to calculate a present position of the vehicle, and controls the vehicle display device to display road traffic information including a display synthesized with the present position on a map on the basis of map data read from a map information memory medium, the vehicle navigation device characterized in that the distance sensor and the vehicle display device are connected to a bus wired to be drawn around in an inside of the vehicle, the vehicle display device and the navigation unit are connected to each other through a serial communication line, and in the case where the navigation unit can not receive the distance data within the reception period, an estimated value of a current value to be received is obtained from a variation between a value inputted previously and a value inputted the time before, the navigation unit calculates the present position on the basis of the estimated value, and an error contained in the estimated value is calculated and corrected from a value to be properly received in future and the estimated value.

* * * * *